(12) United States Patent
Lu

(10) Patent No.: US 9,194,711 B2
(45) Date of Patent: Nov. 24, 2015

(54) NAVIGATION SYSTEM WITH GRADE-SEPARATION DETECTION MECHANISM AND METHOD OF OPERATION THEREOF

(76) Inventor: Wei Lu, Beijing (CN)

(*) Notice: Subject to any disclaimer, the term of this patent is extended or adjusted under 35 U.S.C. 154(b) by 295 days.

(21) Appl. No.: 13/340,048

(22) Filed: Dec. 29, 2011

(65) Prior Publication Data
US 2013/0173149 A1 Jul. 4, 2013

(51) Int. Cl.
G01C 21/26 (2006.01)
G01C 21/32 (2006.01)

(52) U.S. Cl.
CPC .................................... G01C 21/32 (2013.01)

(58) Field of Classification Search
CPC .......... G01C 21/32; G01C 21/14; G01C 21/26
USPC ................ 701/410, 424, 437, 553; 340/995.2
See application file for complete search history.

(56) References Cited

U.S. PATENT DOCUMENTS

| 6,115,668 A | 9/2000 | Kaneko et al. |
| 7,480,565 B2 | 1/2009 | Ikeuchi et al. |
| 2005/0209776 A1* | 9/2005 | Ogino ............................ 701/211 |
| 2009/0112463 A1* | 4/2009 | Yamane et al. ................ 701/209 |
| 2009/0125235 A1 | 5/2009 | Chen et al. |
| 2009/0216442 A1 | 8/2009 | Luert |
| 2009/0228212 A1* | 9/2009 | Smartt et al. ....................... 702/5 |
| 2010/0082252 A1 | 4/2010 | Asanuma |
| 2011/0196607 A1* | 8/2011 | Tsai et al. ....................... 701/207 |

FOREIGN PATENT DOCUMENTS

JP 2007-010545 * 1/2007

OTHER PUBLICATIONS

Machine Translation of JP-2007-010545-A (Translated on Dec. 12, 2013).*

* cited by examiner

*Primary Examiner* — John Q Nguyen
*Assistant Examiner* — Nadeem Odeh
(74) *Attorney, Agent, or Firm* — IP Investment Law Group

(57) ABSTRACT

A method of operation of a navigation system includes: identifying a device location; selecting a maneuver type with the device location; and determining a junction-type with the maneuver type for displaying on a device.

20 Claims, 6 Drawing Sheets

NAVIGATION SYSTEM WITH GRADE-SEPARATION DETECTION MECHANISM AND METHOD OF OPERATION THEREOF

TECHNICAL FIELD

The present invention relates generally to a navigation system, and more particularly to a navigation system using maps.

BACKGROUND ART

Modern portable consumer and industrial electronics, such as navigation systems, cellular phones, portable digital assistants, and combination devices, are providing increasing levels of functionality to support modern life including location-based information services. Research and development in the existing technologies can take a myriad of different directions.

As users become more empowered with the growth of mobile communication technology, new and old paradigms begin to take advantage of this new device space. There are many technological solutions to take advantage of this new device location opportunity. Further, the market space seeks technological advancements, such as ones based on the device location opportunity, which may provide comfort and efficiency in the consumers' daily lives.

Thus, a need still remains for a navigation system that can provide further functionalities based on device location data. In view of the increasing consumer needs, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: identifying a device location; selecting a maneuver type with the device location; and determining a junction-type with the maneuver type for displaying on a device.

The present invention provides a navigation system, including: a movement module for identifying a device location; a behavior module, coupled to the movement module, for selecting a maneuver type with the device location; and a determination module, coupled to the behavior module, for determining a junction-type with the maneuver type for displaying on a device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
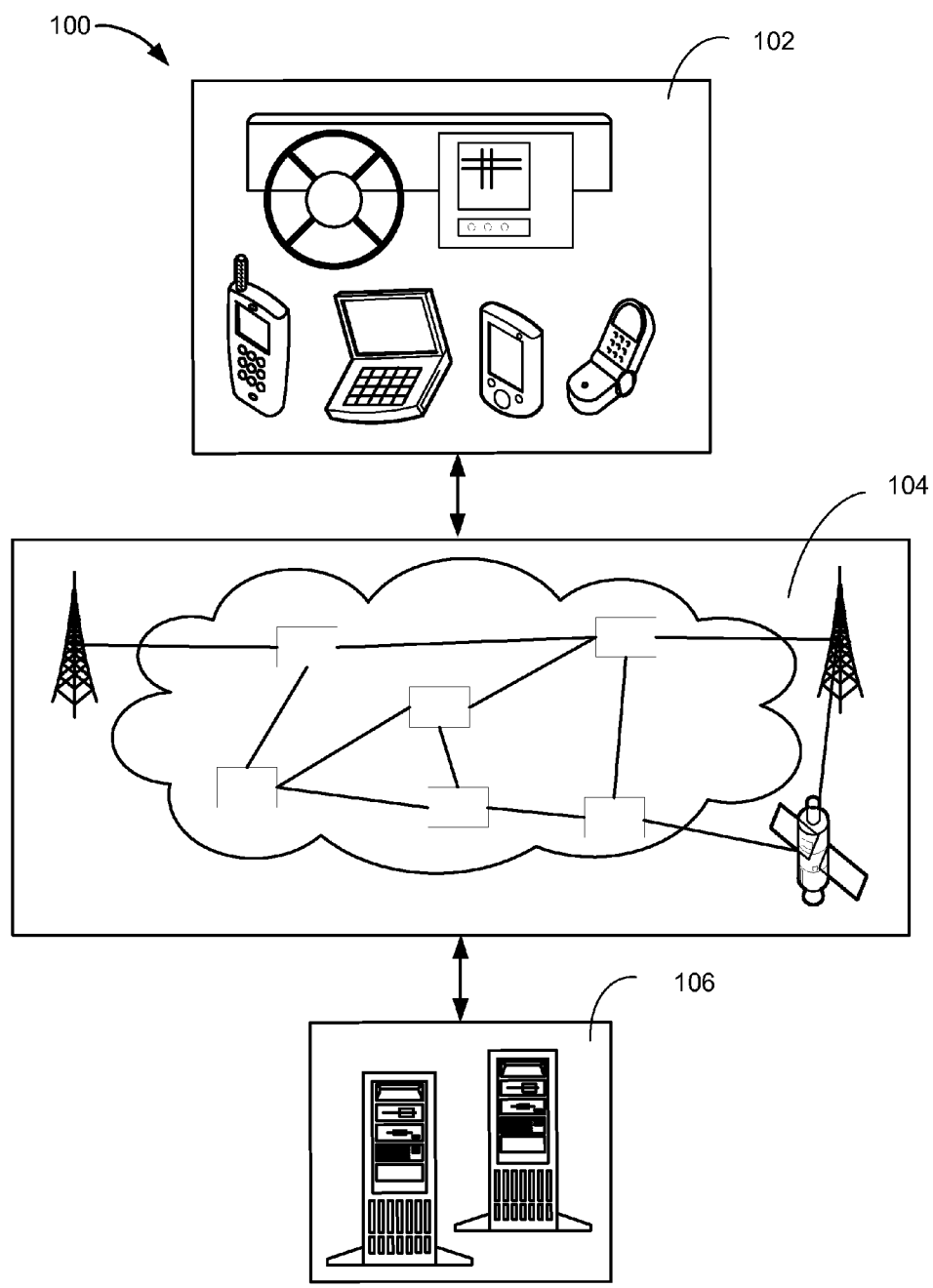
FIG. 1 is a navigation system with grade-separation detection mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein includes the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

The term "processing" as used herein includes filtering signals, decoding symbols, assembling data structures, transferring data structures to peripheral storage devices, manipulating data structures, and reading data structures from external sources. Data structures can be files, input data, system generated data, such as calculated data, and program data.

Referring now to FIG. 1, therein is shown a navigation system 100 with grade-separation detection mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10 Business Class mainframe or a HP ProLiant ML server. Yet another example, the second device 106 can be a particularized machine, such as a portable computing device, a thin client, a notebook, a netbook, a smartphone, personal digital assistant, or a cellular phone, and as specific examples, an Apple iPhone, Palm Centro, or Moto Q Global For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard, wireless fidelity, and worldwide interoperability for microwave access are examples of wireless communication that can be included in the communication path 104. Ethernet, digital subscriber line, fiber to the home, and plain old telephone service are examples of wired communication that can be included in the communication path 104.

Further, the communication path 104 can traverse a number of network topologies and distances. For example, the communication path 104 can include direct connection, personal area network, local area network, metropolitan area network, wide area network or any combination thereof.

Figure 2:
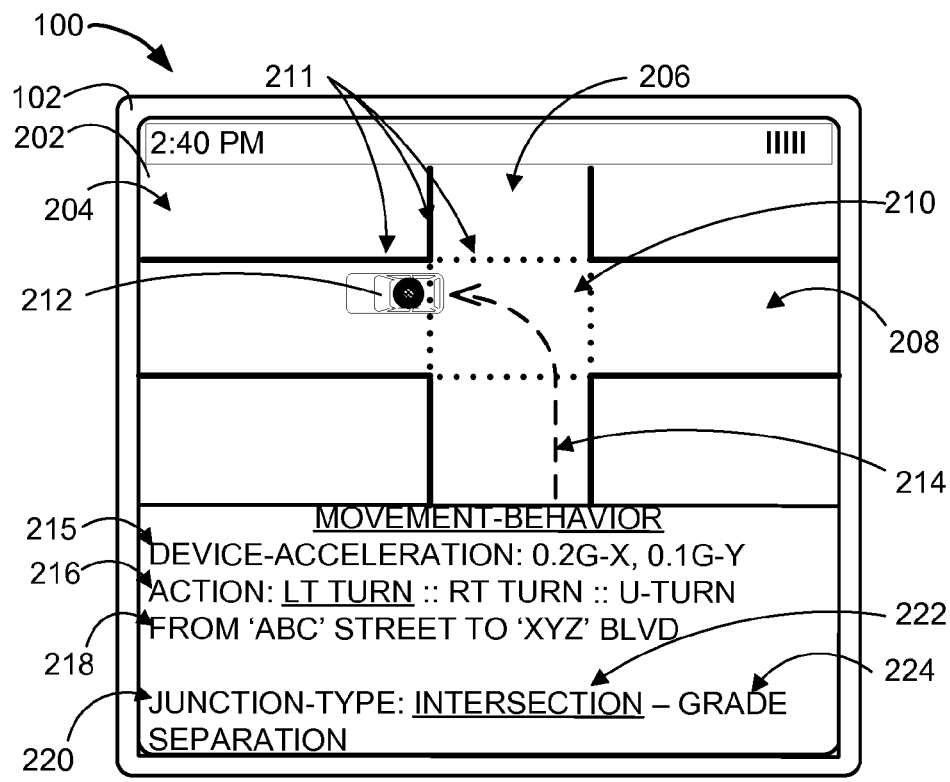
FIG. 2 is a first example of a display interface of the first device.

Referring now to FIG. 2, therein is shown a first example of a display interface 202 of the first device 102. The display interface 202 can show a map 204. For example, the map 204 can represent a layout of a city visually or represent a city block with a series of written or audible coordinates, such as global positioning system (GPS) coordinates or longitude and latitude, of entities that make up the city block.

The map 204 can show a first road segment 206 and a second road segment 208. The first road segment 206 and the second road segment 208 are defined as paths on the map 204 designated for traveling. For example, the first road segment 206, the second road segment 208, or both can be a road, a highway, a trail a path, a side walk, a train track, a corridor, a plane course, a ship course, or a combination thereof. Also, for example, the first road segment 206 can be 'XYZ' boulevard and the second road segment 208 can be 'ABC' street as depicted in the display interface 202.

The map 204 can also show a road-crossing 210. The road-crossing 210 is defined as a location where two or more paths designated for travelling cross. The road-crossing 210 can be an area where the first road segment 206 and the second road segment 208 physically meet at the same height or overlap with the segments separated by a vertical distance. For example, the road-crossing 210 can be a street intersection, a highway underpass with a road underneath, or a train track and a pedestrian walkway there-over.

The road-crossing 210 can be identified by path edges 211. The path edges 211 are defined as coordinates marking the boundaries of the path. The path edges 211 can be the ends or the boundaries of a walkway, a road, a lane, a route, a channel, or a combination thereof. The path edges 211 can be marked on the map 204 or displayed through the display interface 202 using a marking convention, such as solid lines or colors. The dotted lines showing the path edges 211 are for illustrative purposes for describing the road-crossing 210.

The display interface 202 can also show a device location 212. The device location 212 is defined as the navigation information representing the physical location of the first device 102. The device location 212 can be the longitude and latitude coordinates, location information relative to the map 204, or a combination thereof representing the physical location or position of the first device 102. For example, the device location 212 can be the physical address of the house the first device 102 is located in or a point corresponding to the location of the first device 102 on the map 204 displayed on the display interface 202.

The navigation system 100 can use the device location 212 to identify a traveled-path 214, which can be shown on the display interface 202. The traveled-path 214 is defined as a sequential set of past locations for the first device 102. For example, the traveled-path 214 can be a set of last five sampled coordinates for the first device 102. Also, for example, the traveled-path 214 can be represented in a visual depiction on the map 204 of the route the first device 102 has traveled. The details regarding the determination and the use of the traveled-path 214 will be discussed below.

The device interface 202 can show a device-acceleration 215. The device-acceleration 215 is defined as a rate of change in speed of the first device 102. The device-acceleration 215 can be along a horizontal plane. The device-acceleration 215 can be a direction of the change in speed, a magnitude of the change in speed over time, or a combination thereof. The direction of the change can be relative to the first device 102, relative to an absolute direction or coordinate system, such as North-South-East-West or the longitude-latitude system, or a combination thereof.

The device-acceleration 215 can further include the duration of the acceleration. For example, if the first device 102 accelerated in a determined forward direction at average of 0.2 G for 5 seconds, the device-acceleration 215 can be '0.2 G, forward, 5.0 seconds'.

For example, the device-acceleration 215 can be that the first device 102 is accelerating in the direction of the device interface 202 at 10 miles-per-hour per second. Also, for example, the device-acceleration 215 can be westward on 'XYZ' boulevard, away from 'ABC' street or 0.2 times the magnitude of gravity (G) in an arbitrary X or left direction and 0.1 G in an arbitrary Y or forward direction.

The navigation system 100 can use the traveled-path 214, the device location 212, the device-acceleration 215, or a combination thereof to determine a maneuver type 216 and a maneuver-detail 218, which can both be shown on the display interface 202. The maneuver type 216 is defined as a behavior related to movement of the first device. For example, the maneuver type 216 can include acceleration and a direction of the change in speed, a constant velocity, a left or right turn, stop, or a combination thereof.

The maneuver type 216 can also be a recognized pattern of a location, a movement, or both. For example, the maneuver type 216 can be a pattern of orientation or direction, an acceleration, a speed, or a combination thereof classifying a turn or a stop.

The maneuver-detail 218 is defined as the location information before and after the first device 102 performs the maneuver type 216. For example, the maneuver-detail 218 for a left turn can be 'from ABC street to XYZ boulevard'. Also, for example, the maneuver-detail 218 can be a traffic-stop for when a vehicle having the first device 102 comes to a stop at a traffic light. The determination and the uses of the maneuver type 216 and the maneuver-detail 218 will be discussed below.

The navigation system 100 can use the device location 212, the traveled-path 214, the device-acceleration 215, the maneuver type 216, the maneuver-detail 218, or a combination thereof to determine a junction-type 220, which can also be shown on the display interface 202. The junction-type 220 is defined as a classification for the road-crossing 210. The junction-type 220 can be based on the relative location of the segments crossing each other in the road-crossing 210.

The junction-type 220 can include an intersection 222 or a grade-separation 224. The intersection 222 is defined as the road-crossing 210 where the segments of the road-crossing 210 are physically connected at the main road segments. The intersection 222 can have the same vertical location and can have the user, the first device 102, a vehicle, or a combination thereof travel from one segment to another segment making up the intersection 222. The intersection 222 can also be without any additional segments, such as on ramps or transfer ramps, connecting the main road segments.

For example, the intersection 222 can be where the 'ABC' street and the 'XYZ' boulevard physically meet. The intersection 222 can be an area that can be identified as both the 'ABC' street and the 'XYZ' boulevard. Also, for example, the intersection 222 can be the area where a driver of a car can go from the 'ABC' street to the 'XYZ' boulevard by executing the maneuver type, such as a left or right turn.

When displayed or marked on the map 204, the intersection 222 can have the path edges 211 of the first road segment 206 and the second road segment 208 meet without going through the first road segment 206 and the second road segment 208. For example, the dotted lines surrounding the road-crossing 210 in FIG. 2 can disappear when the road-crossing 210 is the intersection 222.

The grade-separation 224 is defined as the road-crossing 210 where the crossing segments are not physically connected at the main road segments. The grade-separation 224 can be where the segments making up the road-crossing 210 are separated in height, where on ramps or transfer ramps are used to traverse from one segment to another in the road-crossing 210. For example, the grade-separation 224 can be a highway overpass or an elevated pedestrian walkway over a street or railroad tracks.

When displayed or marked on the map 204, the grade-separation 224 can have the path edges 211 of the first road segment 206 or the second road segment 208 extend through the first road segment 206 or the second road segment 208. For example, the road-crossing 210 can be the grade-separation 224 for an overpass with the first road segment 206 overlapping the second road segment 208. The vertical dotted lines surrounding the road-crossing 210 in FIG. 2 can be solid lines and have the path edges 211 of the first road segment 206 extend through the second road segment 208.

Also, for example, the horizontal dotted lines can be solid lines when the first road segment 206 is an underpass passing below the second road segment 208. The path edges 211 of the second road segment 208 can extend through the first road segment 206.

The navigation system 100 can determine the junction-type 220 by determining the intersection 222 and the grade-separation 224. The details regarding the determination and the use of the junction-type 220 will be discussed below.

Figure 3:
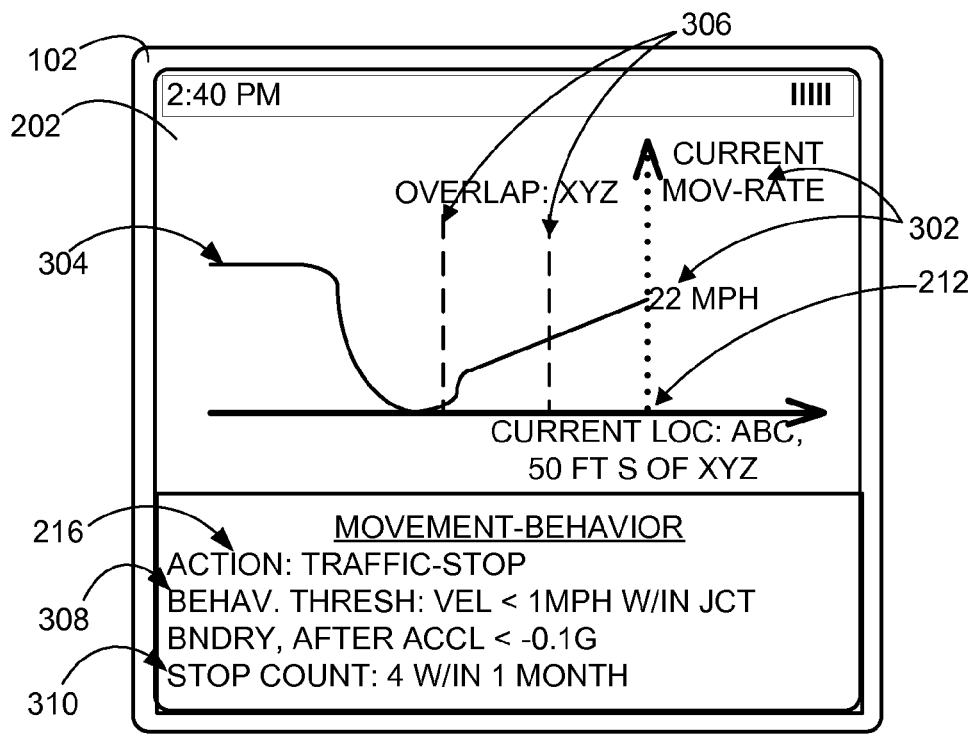
FIG. 3 is a second example of the display interface of the first device.

Referring now to FIG. 3, therein is shown a second example of the display interface 202 of the first device 102. The display interface 202 can show a current movement-rate 302. The current movement-rate 302 is defined as the rate of displacement of the first device 102. The current movement-rate 302 can include speed, direction, or both describing the rate of displacement of the first device 102.

For example, the current movement-rate 302 can be two miles-per-hour displacement rate of a user walking. Also, for example, the current movement-rate 302 can be 95 kilometers-per-hour displacement rate towards south of a vehicle having the first device 102 therein and traveling southbound on a road.

The display interface 202 can show a current speed-location profile 304 of the first device 102. The current speed-location profile 304 is defined as a series of speed readings of the first device 102 with respect to a particular location, such as various coordinate points on the map 204 of FIG. 2. The current speed-location profile 304 can include the current movement-rate 302 corresponding to the device location 212.

The current speed-location profile 304 can also include the corresponding speed and location information leading up to a current time or location, such as the time duration since the vehicle ignition started until now or for the past 5 miles or 10 minutes. Details regarding determination and use of the current movement-rate 302 and the current speed-location profile 304 will be discussed below.

The display interface 202 can show a junction region 306. The junction region 306 is defined as a threshold region for processing data related to the road-crossing 210 of FIG. 2. The junction region 306 can be the outlining locations of the road-crossing 210 or locations surrounding the road-crossing 210.

For example, the junction region 306 can be a series of coordinates along a straight line between each of the corners making up the road-crossing 210. Also, for example, the junction region 306 can be a set of coordinates that are 20 feet away from where the centers of the roads making up the road-crossing 210 meet. For further example, the junction region 306 can be half way points of blocks adjacent to the road-crossing 210. Details regarding determination and use of the junction region 306 will be discussed below.

The display interface 202 can show a behavior threshold 308. The behavior threshold 308 is defined as navigation information for determining the maneuver type 216. The behavior threshold 308 can be description or threshold for recognizing and selecting the maneuver type 216 from a pattern of movement. The behavior threshold 308 can used for comparison including comparing a location, an acceleration, a movement, a direction, a speed, a velocity, a combination thereof, or a sequence thereof.

For example, a pattern for recognizing a left turn executed by an automobile can be acceleration in the left direction exceeding 0.05 g for at least 2 seconds. Also, for example, a value of the behavior threshold 308 for a 'TRAFFIC STOP' value of the maneuver type 216 can be when acceleration is less than −0.1 G along a forward-backward axis leading to velocity of less than one miles-per-hour within the junction region 306.

The navigation system 100 can use the behavior threshold 308 to determine or select the maneuver type 216. The details regarding the use of the behavior threshold 308 will be discussed below.

The display interface 202 can also show a stop count 310. The stop count 310 is defined as a number of times the first device 102 has come to a stop within the junction region 306. The stop count 310 can be limited to occurrences within a period of time. For example, the stop count 310 can be within the last month, since the number was last reset, or from initialization. Details regarding determination and use of the stop count 310 will be discussed below.

Figure 4:
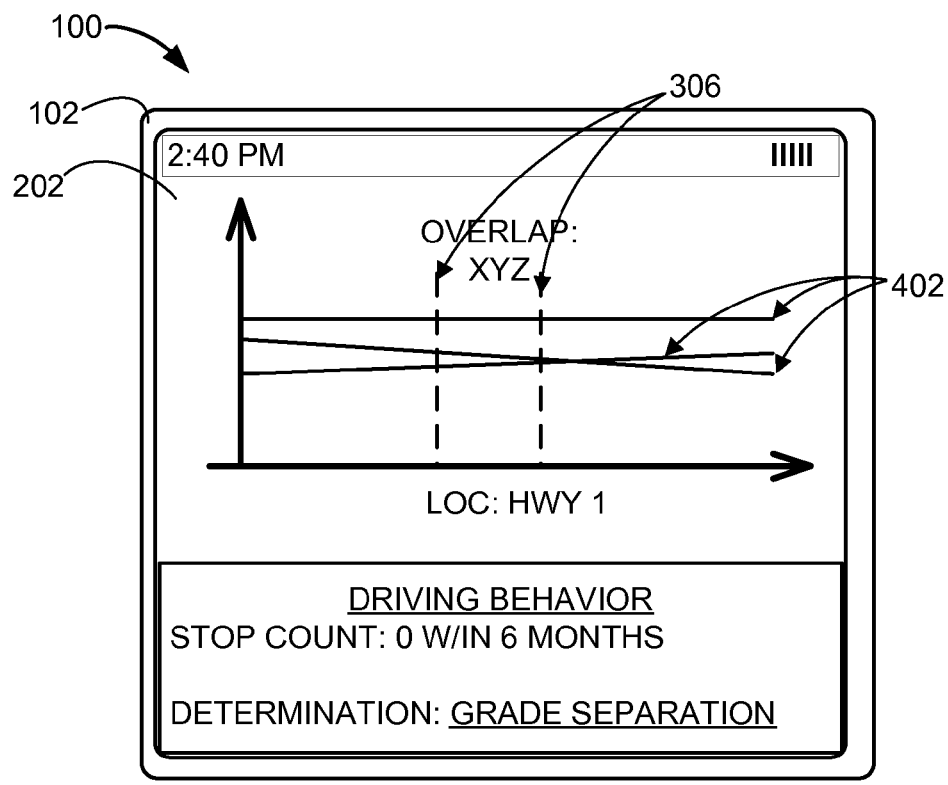
FIG. 4 is a third example of the display interface of the first device.

Referring now to FIG. 4, therein is shown a third example of the display interface 202 of the first device 102. The display interface 202 can show a past speed-location profile 402. The past speed-location profile 402 is defined as a series of speed readings of the first device 102 with respect to a particular location that has previously stored.

The past speed-location profile 402 can be previously occurring speed-location profile of a particular location. For example, the past speed-location profile 402 can be a previously stored value of the current speed-location profile 304 of FIG. 3 corresponding the junction region 306 for a particular junction of roads.

The navigation system 100 can store all values of the past speed-location profile 402. The navigation system 100 can store the past speed-location profile 402 that occurred at a particular location, such as a road crossing. The navigation system 100 can store the past speed-location profile 402 for various time periods. For example, the navigation system 100 can store the last three values of the past speed-location profile 402 at a particular road crossing or all values that has occurred in the last six months at the particular road crossing.

The navigation system 100 can use the past speed-location profile 402 to determine the junction-type 220 of FIG. 2 for the road-crossing 210 of FIG. 2. Details regarding the use of the past speed-location profile 402 will be discussed below.

Figure 5:
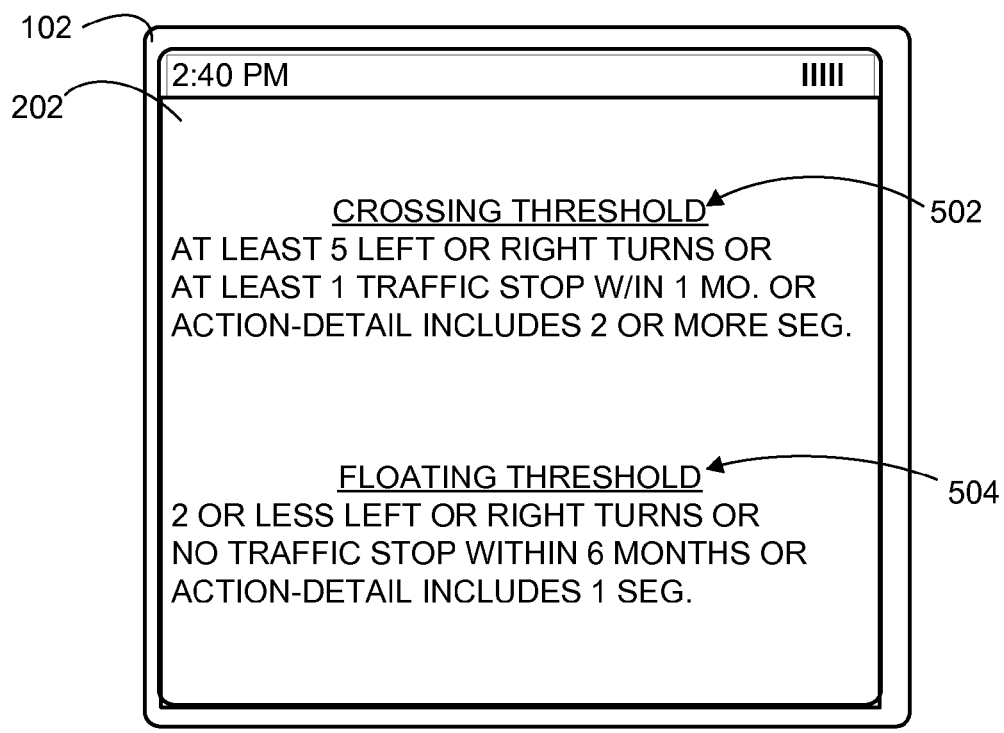
FIG. 5 is a fourth example of the display interface of the first device.

Referring now to FIG. 5, therein is shown a fourth example of the display interface 202 of the first device 102. The display interface 202 can show a crossing-threshold 502 and a floating-threshold 504.

The crossing-threshold 502 is defined as parameters for identifying or selecting behaviors or movement patterns at the intersection 222 of FIG. 2. The crossing-threshold 502 can be used as threshold parameters for determining the junction-type 220 of FIG. 2 of the road-crossing 210 of FIG. 2 as the intersection 222. The crossing-threshold 502 can be for comparing a movement pattern, a maneuver, a collection of behavior or movement over a time period, or a combination thereof.

For example, the crossing-threshold 502 can be at least three turn at the road-crossing 210 or more than four stops within the junction region 306 of FIG. 3 within the last year. The requirement for turns can be more than one to account for random movements or error readings. Also, for example, the crossing-threshold 502 can require one or more of the maneuver-detail 218 of FIG. 2 at the road-crossing 210 to involve at least two of the road segments making up the road-crossing 210.

The floating-threshold 504 is defined as threshold parameters of behaviors or movement patterns within the road-crossing 210 for identifying or selecting the grade separation 224 of FIG. 2. The floating-threshold 504 can be used as threshold parameters for determining the junction-type 220 of the road-crossing 210 as the grade-separation 224. The floating-threshold 504 can be a movement pattern, determined behavior of the movement, collection of behavior or movement over a time period, or a combination thereof.

For example, if the crossing-threshold 502 requires at least one turn at the road-crossing 210, the floating-threshold 504 can require no turns or less than three turns total at the road-crossing 210. Also, for example, if the crossing-threshold 502 requires the maneuver-detail 218 to involve different road segments in the road-crossing 210, the floating-threshold 504 can require the maneuver-detail 218 to involve same road segment.

The navigation system 100 can classify the junction-type 220 of the road-crossing 210 having the navigation data or behavior meeting the crossing-threshold 502 as the intersection 222 and the road-crossing 210 meeting the floating-threshold 504 as the grade-separation 224. The navigation system 100 can also determine the road-crossing 210 not meeting the crossing-threshold 502 as the grade-separation 224 and the road-crossing 210 not meeting the floating-threshold 504 as the intersection 222. The details regarding the setting and usage of the crossing-threshold 502 and the floating-threshold will be discussed below.

Figure 6:
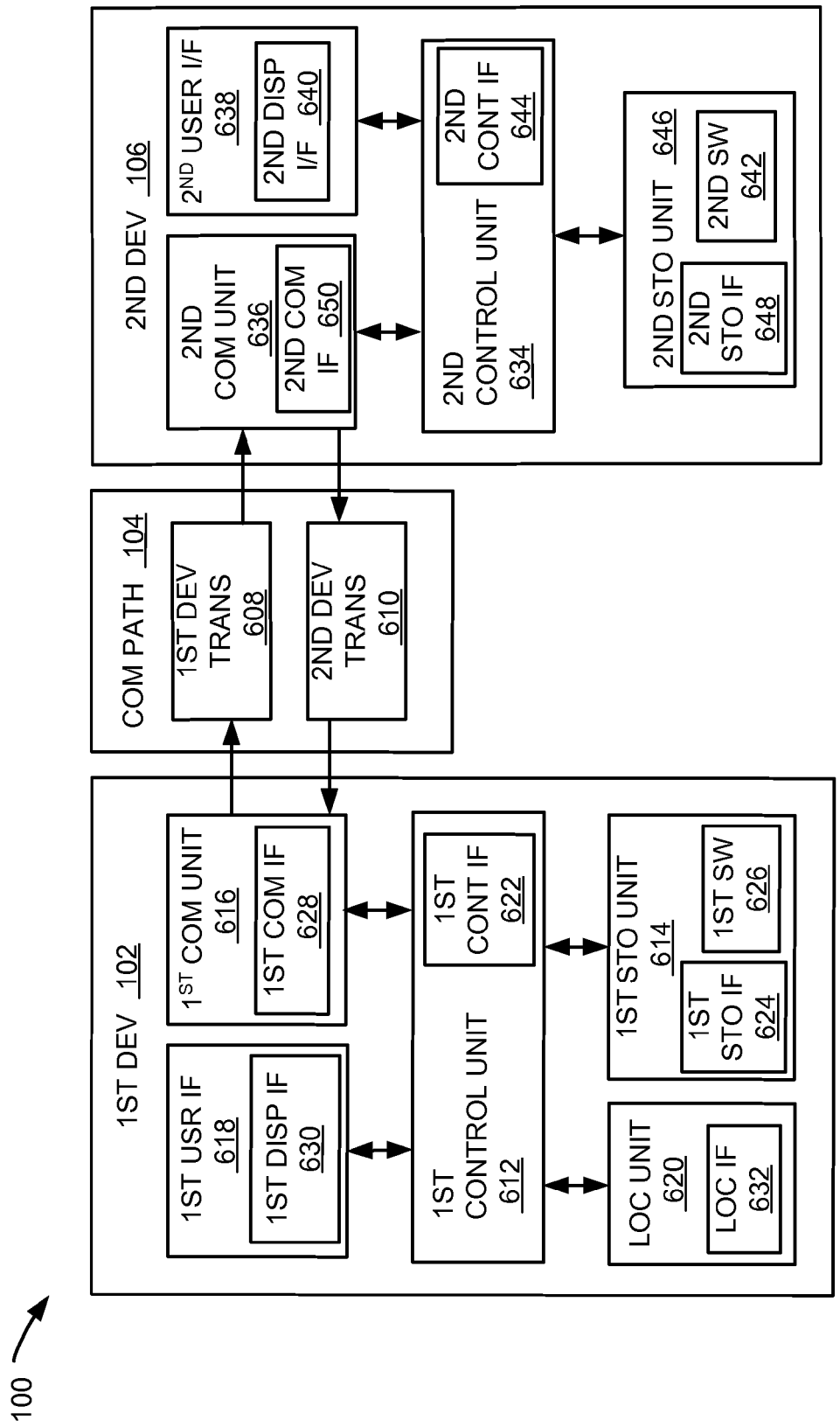
FIG. 6 is an exemplary block diagram of the navigation system.

Referring now to FIG. 6, therein is shown an exemplary block diagram of the navigation system 100. The navigation system 100 can include the first device 102, the communication path 104, and the second device 106.

The first device 102 can communicate with the second device 106 over the communication path 104. The screen shot shown on the display interface 202 described in FIGS. 2-5 can represent the screen shot for the navigation system 100

The first device 102 can send information in a first device transmission 608 over the communication path 104 to the second device 106. The second device 106 can send information in a second device transmission 610 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 612, a first storage unit 614, a first communication unit 616, a first user interface 618, and a location unit 620. The first control unit 612 can include a first control interface 622. The first storage unit 614 can include a first storage interface 624.

The first control unit 612 can execute a first software 626 to provide the intelligence of the navigation system 100. The first control unit 612 can operate the first user interface 618 to display information generated by the navigation system 100. The first control unit 612 can also execute the first software 626 for the other functions of the navigation system 100, including receiving location information from the location unit 620. The first control unit 612 can further execute the first software 626 for interaction with the communication path 104 via the first communication unit 616.

The first control unit 612 can be implemented in a number of different manners. For example, the first control unit 612 can be a processor, an embedded processor, a microprocessor, a hardware control logic, a hardware finite state machine, a digital signal processor, or a combination thereof.

The first control unit 612 can include the first control interface 622. The first control interface 622 can be used for communication between the first control unit 612 and other functional units in the first device 102. The first control interface 622 can also be used for communication that is external to the first device 102.

The first control interface 622 can receive information from the other functional units or from external sources, or can transmit information to the other functional units or to external destinations. The external sources and the external destinations refer to sources and destinations external to the first device 102.

The first control interface 622 can be implemented in different ways and can include different implementations depending on which functional units or external units are being interfaced with the first control interface 622. For example, the first control interface 622 can be implemented with a pressure sensor, an inertial sensor, a microelectromechanical system, optical circuitry, waveguides, wireless circuitry, wireline circuitry, or a combination thereof.

The first storage unit 614 can store the first software 626. The first storage unit 614 can also store the relevant information, such as advertisements, points of interest, navigation routing entries, or any combination thereof.

The first storage unit 614 can be a volatile memory, a nonvolatile memory, an internal memory, an external memory, or a combination thereof. For example, the first storage unit 614 can be a nonvolatile storage such as non-volatile random access memory, Flash memory, disk storage, or a volatile storage such as static random access memory.

The first storage unit 614 can include the first storage interface 624. The first storage interface 624 can be used for communication between the location unit 620 and other functional units in the first device 102. The first storage interface 624 can also be used for communication that is external to the first device 102.

The first storage interface 624 can receive information from the other functional units or from external sources, or can transmit information to the other functional units or to external destinations. The external sources and the external destinations refer to sources and destinations external to the first device 102.

The first storage interface 624 can include different implementations depending on which functional units or external units are being interfaced with the first storage unit 614. The first storage interface 624 can be implemented with technologies and techniques similar to the implementation of the first control interface 622.

The first communication unit 616 can enable external communication to and from the first device 102. For example, the first communication unit 616 can permit the first device 102 to communicate with the second device 106, an attachment, such as a peripheral device or a computer desktop, and the communication path 104.

The first communication unit 616 can also function as a communication hub allowing the first device 102 to function as part of the communication path 104 and not limited to be an end point or terminal unit to the communication path 104. The first communication unit 616 can include active and passive components, such as microelectronics or an antenna, for interaction with the communication path 104.

The first communication unit 616 can include a first communication interface 628. The first communication interface 628 can be used for communication between the first communication unit 616 and other functional units in the first device 102. The first communication interface 628 can receive information from the other functional units or can transmit information to the other functional units.

The first communication interface 628 can include different implementations depending on which functional units are being interfaced with the first communication unit 616. The first communication interface 628 can be implemented with technologies and techniques similar to the implementation of the first control interface 622.

The first user interface 618 allows a user to interface and interact with the first device 102. The first user interface 618 can include an input device and an output device. Examples of the input device of the first user interface 618 can include a keypad, a touchpad, soft-keys, a keyboard, a microphone, or any combination thereof to provide data and communication inputs.

The first user interface 618 can include a first display interface 630. Examples of the output device of the first user interface 618 can include the first display interface 630. The first display interface 630 can include a display, a projector, a video screen, a speaker, or any combination thereof.

The location unit 620 can generate location information, current heading, current acceleration, and current speed of the first device 102, as examples. The location unit 620 can be implemented in many ways. For example, the location unit 620 can function as at least a part of GPS, an inertial navigation system, a cellular-tower location system, a pressure location system, or any combination thereof. Also, for example, the location unit 620 can utilize components such as an accelerometer or GPS receiver.

The location unit 620 can include a location interface 632. The location interface 632 can be used for communication between the location unit 620 and other functional units in the first device 102. The location interface 632 can also be used for communication that is external to the first device 102.

The location interface 632 can receive information from the other functional units or from external sources, or can transmit information to the other functional units or to external destinations. The external sources and the external destinations refer to sources and destinations external to the first device 102.

The location interface 632 can include different implementations depending on which functional units or external units are being interfaced with the location unit 620. The location interface 632 can be implemented with technologies and techniques similar to the implementation of the first control unit 612.

For illustrative purposes, the first device 102 is shown with the partition having the first control unit 612, the first storage unit 614, the first user interface 618, the first communication unit 616, and the location unit 620 although it is understood that the navigation system 100 can have a different partition. For example, the first software 626 can be partitioned differently such that some or all of its function can be in the first control unit 612, the location unit 620, and the first communication unit 616. Also, the first device 102 can include other functional units not shown in FIG. 6 for clarity.

The functional units in the first device 102 can work individually and independently of the other functional units. The first device 102 can work individually and independently from the second device 106 and the communication path 104.

The second device 106 can be optimized for implementing the present invention in a multiple device embodiment with the first device 102. The second device 106 can provide the additional or higher performance processing power compared to the first device 102. The second device 106 can include a second control unit 634, a second communication unit 636, and a second user interface 638.

The second user interface 638 allows a user to interface and interact with the second device 106. The second user interface 638 can include an input device and an output device. Examples of the input device of the second user interface 638 can include a keypad, a touchpad, soft-keys, a keyboard, a microphone, or any combination thereof to provide data and communication inputs. Examples of the output device of the second user interface 638 can include a second display interface 640. The second display interface 640 can include a display, a projector, a video screen, a speaker, or any combination thereof.

The second control unit 634 can execute a second software 642 to provide the intelligence of the second device 106 of the navigation system 100. The second software 642 can operate in conjunction with the first software 626. The second control unit 634 can provide additional performance compared to the first control unit 612.

The second control unit 634 can operate the second user interface 638 to display information. The second control unit 634 can also execute the second software 642 for the other functions of the navigation system 100, including operating the second communication unit 636 to communicate with the first device 102 over the communication path 104.

The second control unit 634 can be implemented in a number of different manners. For example, the second control unit 634 can be a processor, an embedded processor, a microprocessor, a hardware control logic, a hardware finite state machine, a digital signal processor, or a combination thereof.

The second control unit 634 can include a second controller interface 644. The second controller interface 644 can be used for communication between the second control unit 634 and other functional units in the second device 106. The second controller interface 644 can also be used for communication that is external to the second device 106.

The second controller interface 644 can receive information from the other functional units or from external sources, or can transmit information to the other functional units or to external destinations. The external sources and the external destinations refer to sources and destinations external to the second device 106.

The second controller interface 644 can be implemented in different ways and can include different implementations depending on which functional units or external units are being interfaced with the second controller interface 644. For example, the second controller interface 644 can be implemented with a pressure sensor, an inertial sensor, a micro electromechanical system, optical circuitry, waveguides, wireless circuitry, wireline circuitry, or a combination thereof.

A second storage unit 646 can store the second software 642. The second storage unit 646 can also store the relevant information, such as advertisements, points of interest, navigation routing entries, or any combination thereof. The second storage unit 646 can be sized to provide the additional storage capacity to supplement the first storage unit 614.

For illustrative purposes, the second storage unit 646 is shown as a single element, although it is understood that the second storage unit 646 can be a distribution of storage elements. Also for illustrative purposes, the navigation system 100 is shown with the second storage unit 646 as a single hierarchy storage system, although it is understood that the navigation system 100 can have the second storage unit 646 in a different configuration. For example, the second storage unit 646 can be formed with different storage technologies forming a memory hierarchal system including different levels of caching, main memory, rotating media, or off-line storage.

The second storage unit 646 can be a volatile memory, a nonvolatile memory, an internal memory, an external memory, or a combination thereof. For example, the second storage unit 646 can be a nonvolatile storage such as nonvolatile random access memory, Flash memory, disk storage, or a volatile storage such as static random access memory.

The second storage unit 646 can include a second storage interface 648. The second storage interface 648 can be used for communication between the location unit 620 and other functional units in the second device 106. The second storage interface 648 can also be used for communication that is external to the second device 106.

The second storage interface 648 can receive information from the other functional units or from external sources, or can transmit information to the other functional units or to external destinations. The external sources and the external destinations refer to sources and destinations external to the second device 106.

The second storage interface 648 can include different implementations depending on which functional units or external units are being interfaced with the second storage unit 646. The second storage interface 648 can be implemented with technologies and techniques similar to the implementation of the second controller interface 644.

The second communication unit 636 can enable external communication to and from the second device 106. For example, the second communication unit 636 can permit the second device 106 to communicate with the first device 102 over the communication path 104.

The second communication unit 636 can also function as a communication hub allowing the second device 106 to function as part of the communication path 104 and not limited to be an end point or terminal unit to the communication path 104. The second communication unit 636 can include active and passive components, such as microelectronics or an antenna, for interaction with the communication path 104.

The second communication unit 636 can include a second communication interface 650. The second communication interface 650 can be used for communication between the second communication unit 636 and other functional units in the second device 106. The second communication interface 650 can receive information from the other functional units or can transmit information to the other functional units.

The second communication interface 650 can include different implementations depending on which functional units are being interfaced with the second communication unit 636. The second communication interface 650 can be implemented with technologies and techniques similar to the implementation of the second controller interface 644.

The first communication unit 616 can couple with the communication path 104 to send information to the second device 106 in the first device transmission 608. The second device 106 can receive information in the second communication unit 636 from the first device transmission 608 of the communication path 104.

The second communication unit 636 can couple with the communication path 104 to send information to the first device 102 in the second device transmission 610. The first device 102 can receive information in the first communication unit 616 from the second device transmission 610 of the communication path 104. The navigation system 100 can be executed by the first control unit 612, the second control unit 634, or a combination thereof.

For illustrative purposes, the second device 106 is shown with the partition having the second user interface 638, the second storage unit 646, the second control unit 634, and the second communication unit 636, although it is understood that the second device 106 can have a different partition. For example, the second software 642 can be partitioned differently such that some or all of its function can be in the second control unit 634 and the second communication unit 636. Also, the second device 106 can include other functional units not shown in FIG. 6 for clarity.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 620, although it is understood that the second device 106 can also operate the location unit 620.

Figure 7:
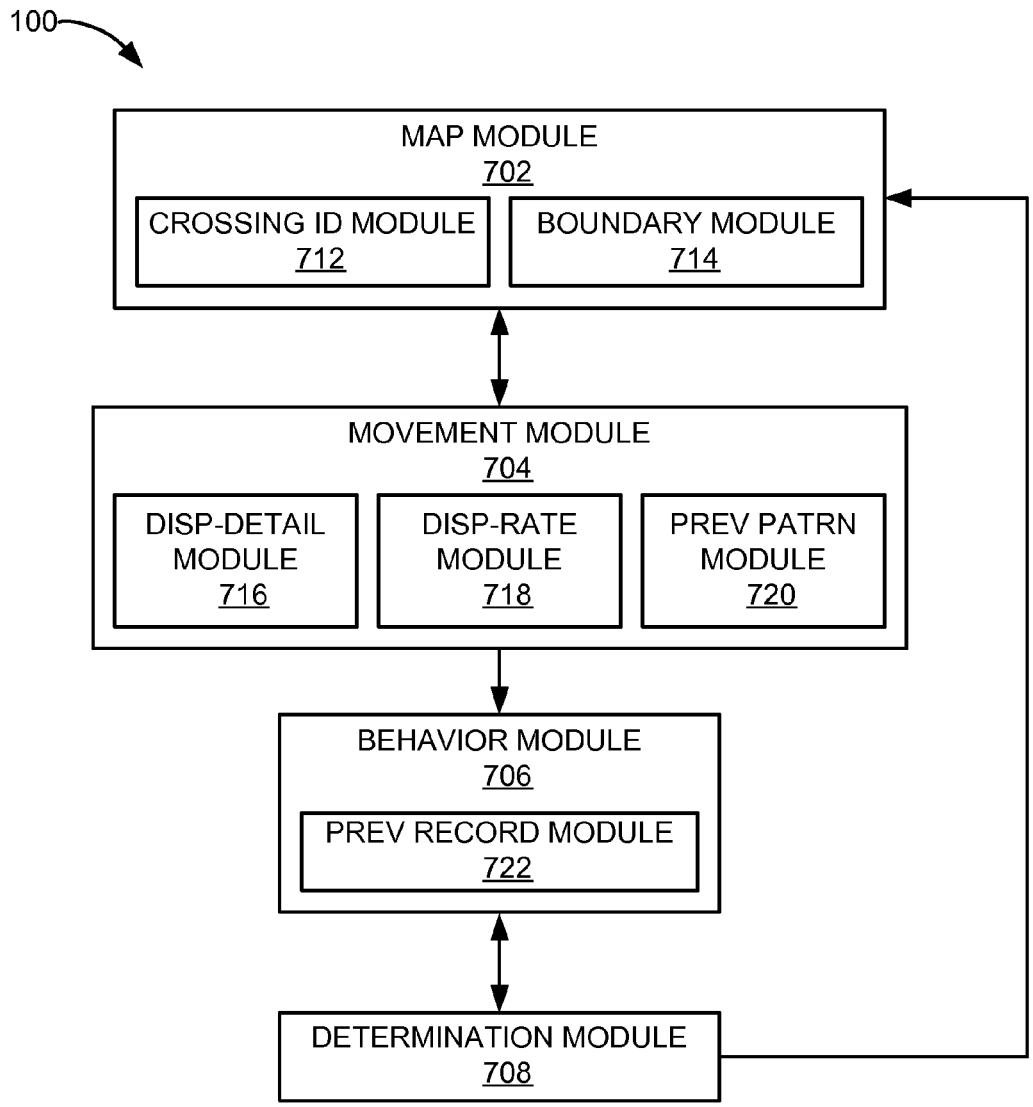
FIG. 7 is a control flow of the navigation system.

Referring now to FIG. 7, therein is shown a control flow of the navigation system 100. The navigation system 100 can have a map module 702, a movement module 704, a behavior module 706, and a determination module 708.

The map module 702 can be coupled to the movement module 704, which can be coupled to the behavior module 706. The behavior module can be coupled to the determination module 708, which can be coupled to the map module 702.

The map module 702 is for selecting the map 204 of FIG. 2 having the road-crossing 210 of FIG. 2. The map module 702 can select the map 204 by locating and displaying the map 204 or a relevant portion thereof.

The map module 702 can have various maps stored in the first storage unit 614 of FIG. 6, the second storage unit 646 of FIG. 6, or both. For example, the map module 702 can have maps for countries, regions, states, counties, cities, neighborhoods, blocks, or a combination thereof stored in the first storage unit 614, the second storage unit 646, or both. The various maps can be stored by the navigation system 100, a software or hardware manufacturer, a service provider, user, or a combination thereof.

The map module 702 can select the map 204 by identifying the map 204 having a point of interest. The map module 702 can use the first control unit 612 of FIG. 6, the second control unit 634 of FIG. 6, or both to search the various maps stored in the first storage unit 614, the second storage unit 646, or both for the point of interest. The map module 702 can further use the first control unit 612, the second control unit 634, or both to identify the instance of the various maps having the point of interest as the map 204. The map module 702 can use similar processes to locate the map 204 by identifying the portion of the map 204 having the point of interest.

For example, the map module 702 can identify the map 204 of the country, region, state, county, city, neighborhood, block, or a combination thereof having a searched item, starting point or destination of the route, notable or marked location, or a combination thereof. Also, for example, the map module 702 can identify a portion of the map 204 for an immediate area surrounding the device location 212 of FIG. 2, which can be received from the movement module 704. The identification of the device location 212 will be discussed below.

The map module 702 can update the map 204 using data received through the first communication unit 616 of FIG. 6, the second communication unit 636 of FIG. 6, the first user interface 618 of FIG. 6, the second user interface 638 of FIG. 6, or a combination thereof. The map module 702 can also update the map 204 using the junction-type 220 of FIG. 2 determined by the determination module 708.

For example, the map module 702 can change line markings noting the boundaries of the roads or routing procedure according to the determination of the road-crossing 210 as the intersection 222 of FIG. 2 or the grade-separation 224 of FIG. 2. The determination of the junction-type 220 for the road-crossing 210 will be discussed below.

The map module 702 can also display the map 204. The map module 702 can use the first control unit 612, the second control unit 634, or both to display the map 204 on the first user interface 618, the second user interface 638, or both.

The map module 702 can further identify on the map 204 the road-crossing 210 and boundaries for processing data to determine the junction-type 220. The map module 702 can have a crossing-identification module 712 and a boundary module 714 for identifying the road-crossing 210 and boundaries on the map 204.

The crossing-identification module 712 is for identifying the road-crossing 210. The crossing-identification module 712 can identify the road-crossing 210 between the first road segment 206 of FIG. 2 and the second road segment 208 of FIG. 2 on the map 204. The crossing-identification module 712 can use the first control interface 622 of FIG. 6, the second controller interface 644 of FIG. 6, the first storage interface 624 of FIG. 6, the second storage interface 648 of FIG. 6, or a combination thereof to access the map 204 identified by the map module 702.

The crossing-identification module 712 can identify the road-crossing 210 on the map 204 by using the first control unit 612, the second control unit 634, or both to identify a path, such as a street or a route. The crossing-identification module 712 can follow the path until a junction for multiple paths is found.

The map 204 may also have a list of all junctions where more than one paths cross. The crossing-identification module 712 can read the location information of the junctions of such list to identify the road-crossing 210.

The crossing-identification module 712 can further follow the first road segment 206. The crossing-identification module 712 can check coordinates of the road from one end of the map 204 to the end of the first road segment 206 to see if the coordinates of the edges of the first road segment 206 also correspond to the edges of the second road segment 208.

The crossing-identification module 712 can identify the area on the map 204 having coordinates corresponding to both the first road segment 206 and the second road segment 208 as the road-crossing 210. The crossing-identification module 712 can store the road-crossing 210 in the first storage unit 614, the second storage unit 646, or both along with the map 204.

For illustrative purposes, the road-crossing 210 is described as an intersection or overlap of the first road segment 206 and the second road segment 208. However, it is understood that the road-crossing 210 can be different. For example, the road-crossing 210 can include more than two road segments or include on ramps and off ramps.

The crossing-identification module 712 can use the process described above for all road segments for locations where the coordinates correspond to more than one road segment. The crossing-identification module 712 can also identify all instances of the road-crossing 210 on the portion of the map 204 selected by the map module 702 using the same process.

The crossing-identification module 712 can pass control, the road-crossing 210, or both to the boundary module 714. The boundary module 714 is for identifying the junction region 306 of FIG. 3 surrounding the road-crossing 210.

The boundary module 714 can identify the junction region 306 by setting coordinates surrounding the road-crossing 210. For example, the boundary module 714 can set the coordinates 200 feet away from a center of the road-crossing 210 as the junction region 306. Also, for example, the boundary module 714 can determine a line across the first road segment 206 or the second road segment 208 connecting the point where the edges of the two segments meet. The boundary module 714 can identify the coordinates of the area defined by such lines as the road-crossing 210 or coordinates 50 meters away from the determine lines-.

For further example, the boundary module 714 can identify halfway points of city blocks adjacent to the road-crossing 210. The boundary module 714 can determine coordinates connecting the halfway points in a straight line or along a shortest continuous path across the first road segment 206 or the second road segment 208.

The boundary module 714 can set the identified or determined coordinates surrounding the road-crossing 210 as the junction region 306. The boundary module 714 can use a predetermined distance away from the road-crossing 210, method, or a combination thereof to identify or determine the coordinates for the junction region 306. The distances and methods for determining the junction region 306 can be predetermined by the navigation system 100, the software or hardware manufacturer, the user, or a combination thereof.

The boundary module 714 can use the first software 626 of FIG. 6, the second software 642, of FIG. 6, the distances or methods stored in the first storage unit 614, the second storage unit 646, or a combination thereof to identify the junction region 306. The boundary module 714 can use the first control unit 612, the second control unit 634, or both to access and process the data according to the software, distances, methods, or combinations described above.

The boundary module 714 can vary the distances or methods for determining the road-crossing 210 based on time or situation. For example, the boundary module 714 can adjust the junction region 306 to be 30% further away from the road-crossing 210 during heavy traffic times.

Also, for example, the boundary module 714 can detect road constructions by receiving data from the navigation system 100, government agencies, user, or a combination thereof. The boundary module 714 can adjust the junction region 306 to be 5 meters closer to the road-crossing 210 when a road construction is adjacent to or within the road-crossing 210 or city blocks adjacent to the road-crossing 210. The boundary module 714 can also adjust the junction region 306 to go around or not include the road construction site.

The movement module 704 is for identifying and processing location and movement of the first device 102 of FIG. 1. The movement module 704 can identify the location of the first device 102 by reading the navigation information, such as GPS coordinates or address corresponding to the location of the first device 102, from the location unit 620 of FIG. 6.

The movement module 704 can identify the device location 212, the device-acceleration 215 of FIG. 2, or a combination thereof. The movement module 704 can set the navigation information from the location unit 620 as the device location 212.

The movement module 704 can pass the device location 212 to the map module 702 for identifying the map 204 having the device location 212 therein. The movement module 704 can further receive the map 204 from the map module 702 and display the device location 212 along with the map 204. The movement module 704 can use the first control unit 612, the second control unit 634, or both to identify the device location 212 on the map 204.

The movement module 704 can display a point or an icon on a location of the map 204 corresponding to the device location 212. The movement module 704 can display the device location 212 through the first display interface 630 of FIG. 6, the second display interface 640 of FIG. 6, or both.

The movement module 704 can use the device location 212 to identify and process the movement of the first device 102. The movement module 704 can have a displacement-detail module 716, a displacement-rate module 718, and a previous pattern module 720 for identifying and processing the movement of the first device 102.

The displacement-detail module 716 is for identifying the movement of the first device 102. The displacement-detail module 716 can identify the movement of the first device 102 by identifying the traveled-path 214 of FIG. 2 using the device location 212. The displacement-detail module 716 can identify the traveled-path 214 by sequentially storing the device location 212.

The displacement-detail module 716 can periodically store the device location 212 in order. For example, the displacement-detail module 716 can have a list of the values of the device location 212 stored every minute since a vehicle having the first device 102 was initialized. The displacement-detail module 716 can add new values of the device location 212 to the end of the list.

Also, for example, the displacement-detail module 716 can have a table for storing the device location 212 stored each time the device-acceleration 215 is a non-zero value or beyond a predetermined threshold by the location unit 620. The displacement-detail module 716 can add new coordinate values of the device location 212 to the next open slot in the table.

The displacement-detail module 716 can control the size of the traveled-path 214. The displacement-detail module 716 can control the size of the traveled-path 214 by limiting the number of values for the traveled-path 214, varying sampling intervals or sampling conditions, or a combination thereof.

For example, the displacement-detail module 716 can use a sliding window or a first-in first-out data structure to define the traveled-path 214 and limit the number of coordinates therein. Also, for example, the displacement-detail module 716 can change the sampling interval from 1 minute to 10 seconds or from when changes in acceleration have been detected to when the first device 102 deviates from a calculated route.

The displacement-detail module 716 can also identify the maneuver-detail 218 of FIG. 2 associated with the movement of the first device 102. The displacement-detail module 716 can identify the maneuver-detail 218 by detecting when the first device 102 enters the road-crossing 210. The displacement-detail module 716 can detect when the first device 102 enters the road-crossing 210 by comparing the device location 212 to coordinates of road crossings on the map 204, such as the road-crossing 210.

When the device location 212 matches the coordinates of the road-crossing 210, the displacement-detail module 716 can detect that the first device 102 has entered the road-crossing 210. The displacement-detail module 716 can also store name, value, coordinate, or a combination thereof identifying a road segment the first device 102 was traversing prior to entering the road-crossing 210 in the first storage unit 614, the second storage unit 646, or both.

The displacement-detail module 716 can continue to compare the device location 212 to the coordinates of the road-crossing 210 to detect when the first device 102 exits the road-crossing 210. When the device location 212 does not match the coordinates of the road-crossing 210, the displacement-detail module 716 can detect that the first device 102 has exited the road-crossing 210.

The displacement-detail module 716 can store name, value, coordinate set, or a combination thereof identifying a new road segment that the first device 102 traverses after exiting the road-crossing 210 in the first storage unit 614, the second storage unit 646, or both. The displacement-detail module 716 can identify the stored values of road segments prior to entering and after exiting the road-crossing 210 as the maneuver-detail 218.

The displacement-detail module 716 can use the first control unit 612, the second control unit 634, or both to process the data and identify the maneuver-detail 218. The displacement-detail module 716 can store the maneuver-detail 218 in the first storage unit 614, the second storage unit 646, or both.

Along with location related information of the first device 102, the movement module 704 can track speed related information of the first device 102. The movement module 704 can use the displacement-rate module 718 to track the speed related information.

The displacement-rate module 718 is for tracking the speed related information of the first device 102. The displacement-rate module 718 can track the speed related information by identifying and storing the current movement-rate 302 of FIG. 3, the current speed-location profile 304 of FIG. 3, or a combination thereof.

The displacement-rate module 718 can identify the current movement-rate 302 by using the first control unit 612, the second control unit 634, or both to read speed or velocity information from the location unit 620. The displacement-rate module 718 can also read current acceleration, current heading, current speed, or a combination thereof of the first device 102 from the location unit 620. The displacement-rate module 718 can use the first control unit 612, the second control unit 634, or both to process the data read to calculate speed or velocity information of the first device 102.

The displacement-rate module 718 can identify the current speed-location profile 304 by sequentially storing the current movement-rate 302 at the device location 212. The displacement-rate module 718 can store the device location 212 and the current movement-rate 302 together if the two are separate readings. The displacement-rate module 718 can store the device location 212 having the current movement-rate 302 if the current movement-rate 302 is part of the device location 212.

The displacement-rate module 718 can use linked lists, tables, sliding windows, or any of the methods described above to store the device location 212 and the current movement-rate 302. Newly identified pair of information can be stored to the end to preserve the sequence of locations and speeds. The displacement-rate module 718 can store the current speed-location profile 304 in the first storage unit 614, the second storage unit 646, or both.

The previous pattern module 720 is for tracking the movement by determining the past speed-location profile 402 of FIG. 4. The previous pattern module 720 can determine the past speed-location profile 402 by associating the current speed-location profile 304 and storing the association.

The previous pattern module 720 can store the current speed-location profile 304 whenever the device location 212 matches the coordinates of the road-crossing 210. The previous pattern module 720 can associate the stored value of the current speed-location profile 304 to the road-crossing 210. The previous pattern module 720 can thus accumulate speed related information of the first device 102 when the first device 102 traverses the road-crossing 210. The previous pattern module 720 can set the accumulated values of the speed related information at the road-crossing 210 as the past speed-location profile 402 for the road-crossing 210.

The movement module 704 can pass the location and speed related values to the behavior module 706. The behavior module 706 is for determining the behavior of the first device 102 from movement or location information.

The behavior module 706 can determine the behavior by selecting the maneuver type 216 of FIG. 2 using the device location 212, the device-acceleration 215, or a combination thereof. The behavior module 706 can determine the behavior by selecting the maneuver type 216 using the device location 212 and the device-acceleration 215 along the horizontal plane. The behavior module 706 can access the behavior threshold 308 of FIG. 3 stored in the first storage unit 614, the second storage unit 646, or both by the navigation system 100, the software or hardware manufacturer, the service provider, the user, or a combination thereof.

The behavior module 706 can use the first control unit 612, the second control unit 634, or both to compare the device location 212, the device-acceleration 215, the traveled-path 214, acceleration, speed, velocity, travel direction, the current speed-location profile 304, a combination thereof, or a sequence thereof for the first device 102 to the behavior threshold 308. When the navigation information of the first device 102 meeting the behavior threshold 308, the behavior module 706 can select the name or value of the behavior threshold 308 as the maneuver type 216.

The behavior module 706 can also identify the current movement-rate 302 within the junction region 306 for determining the behavior. The behavior module 706 can check the navigation information of the first device 102 for the current movement-rate 302 whenever the device location 212 matches coordinates of the junction region 306.

The behavior module 706 can have a value of the behavior threshold 308 that identifies a stop within the junction region 306. The behavior module 706 can determine and select the maneuver type 216 based on the conditions of the first device 102 meeting the behavior threshold 308. The behavior module 706 can further determine the stop count 310 of FIG. 3 by incrementing the stop count 310 whenever the conditions are satisfied.

The behavior module 706 can similarly use the maneuver-detail 218 as the navigation information of the first device 102 to compare with the behavior threshold 308. The behavior module 706 can use the maneuver-detail 218 independently or along with the navigation information of the first device 102 to determine and select the maneuver type 216.

It has been discovered that the behavior threshold 308, the traveled-path 214, the maneuver-detail 218, and the behavior module 706 provide simpler processing, faster execution time, and decreased storage space by allowing the navigation system 100 to recognize and process behaviors rather than complex and long sequences of navigation information. It has also been discovered that the maneuver type 216 simplifies the data processing for the navigation system 100 by categorizing navigation information into finite number of known behaviors.

The behavior module 706 can have a previous record module 722. The previous record module 722 is for storing the selected values of the maneuver type 216. The previous record module 722 can store the maneuver type 216 associated with each of the road-crossing 210. The previous record module 722 can link the date and value of the maneuver type 216 that occurred at the road-crossing 210 with the road-crossing 210.

For example, the behavior module 706 can store address of the data device having the map 204 and the road-crossing 210 or a pointer to the road-crossing 210 in the recorded value of the maneuver type 216. Also, for example, the behavior module 706 can have a table for recording the behavior at the road-crossing 210 for each of the crossings. The behavior module 706 can add the maneuver type 216 to the table for each occurrence at the corresponding road crossing.

The behavior module 706 can pass the behavior information to the determination module 708. The determination module 708 is for determining the junction-type 220 of the road-crossing 210 on the map 204. The determination module 708 can determine the junction-type 220 to be the intersection 222 or the grade-separation 224.

The determination module 708 can determine the junction-type 220 based on the maneuver type 216. The determination module 708 can determine the junction-type 220 by comparing the maneuver type 216 to the crossing-threshold 502 of FIG. 5, the floating threshold 504 of FIG. 5, or both.

The determination module 708 can compare by matching the values. The determination module 708 can determine the junction-type 220 when the maneuver type 216 meets or matches the crossing-threshold 502, the floating-threshold 504, or both.

The determination module 708 can determine the junction-type 220 as the intersection 222 using the maneuver type 216 when the maneuver type 216 matches the crossing-threshold 502, when the maneuver type 216 does not match the floating-threshold 504, or both. The determination module 708 can determine the junction-type 220 as the grade-separation 224 using the maneuver type 216 when the maneuver type 216 matches the floating-threshold 504, when the maneuver type 216 does not match the crossing-threshold 502, or both.

For example, the floating-threshold 504 can require no left or right turns at the road-crossing 210 while the crossing-threshold 502 can require at least one instance of either left or right turn. The determination module 708 can determine the road-crossing 210 as the intersection 222 when the maneuver type 216 at the road-crossing 210 is a left turn.

The determination module 708 can determine the junction-type 220 by setting the value of the junction-type 220 of the road-crossing 210 as the intersection 222 or the grade-separation 224 based on the determination. The determination module 708 can also determine the junction-type 220 by identifying the road-crossing 210 as the intersection 222 or the grade-separation 224 based on the determination.

The determination module 708 can also determine the junction-type 220 of the road-crossing 210 using the past speed-location profile 402. The determination module 708 can determine the junction-type 220 to be the grade-separation 224 when the past speed-location profile 402 matches the floating-threshold 504, when the maneuver type 216 does not match the crossing-threshold 502, or both.

Continuing with the example, the floating-threshold 504 can require speeds within the road-crossing 210 to be above 5 miles-per-hour. The determination module 708 can determine the road-crossing 210 to be the grade-separation 224 when the past speed-location profile 402 indicates that the first device 102 has always maintained speeds greater than 5 miles-per-hour while traversing through the road-crossing 210.

The determination module 708 can further determine the intersection 222 when the traveled-path 214 is along the first road segment 206 and the second road segment 208 or when the maneuver-detail 218 indicates behavior involving both the first road segment 206 and the second road segment 208. For example, the crossing-threshold 502 can require continuous travel along two separate road segments adjoining at the road-crossing 210.

Continuing with the example, the determination module 708 can determine the road-crossing 210 to be the intersection 222 when the traveled-path 214 is along both the first road segment 206 and the second road segment 208, and is continuous. Similarly, the determination module 708 can determine the road-crossing 210 to be the intersection when the maneuver-detail 218 includes both the first road segment 206 and the second road segment 208.

The determination module 708 can access the crossing-threshold 502 or the floating-threshold 504 through the first control interface 622, the first storage interface 624, the second controller interface 644, the second storage interface 648, or a combination thereof. The determination module 708 can use the first control unit 612, the second control unit 634, or both to compare the maneuver type 216, the traveled-path 214, the maneuver-detail 218, the past speed-location profile 402, or a combination thereof with the crossing-threshold 502, the floating-threshold 504, or both.

The determination module 708 can pass the determination of the junction-type 220 for the road-crossing 210 to the map module 702. The map module 702 can use the determination of the junction-type 220 to update the road-crossing 210 on the map 204. For example, the map module 702 can change boundary lines or routing details for the first road segment 206, the second road segment 208, the road-crossing 210, or a combination thereof.

The determination module 708 can aggregate the determination of the road-crossing 210 over a period and also from multiple users. The determination module 708 can collect the determination of the road-crossing 210 from multiple users through the first communication unit 616, the second communication unit 636, or both.

The determination module 708 can average the determination from multiple users, over a period of time, or both for a particular instance of the road-crossing 210. The determination module 708 can use predetermined algorithm, weighted average, or other methods to process the data and determine the junction-type 220 of the road-crossing 210 using multiple values.

The determination module 708 can perform the determination process in sequence. For example, the determination module 708 can first perform the process for determining whether the road-crossing 210 is the intersection 222. The determination module 708 can then perform the process for determining whether the road-crossing 210 is the grade-separation 224 if the road-crossing 210 is not determined to be the intersection 222.

The determination module 708 can also perform the determination process in parallel by performing both determinations for the intersection 222 and the grade-separation 224 simultaneously. For example, the determination module 708 can use multiple processing devices simultaneously or alternate the steps in the two determination processes.

The determination module 708 can further perform just one of the determination processes to determine the junction-type 220. For example, the determination module 708 can perform the process for determining whether the road-crossing 210 is the intersection 222. The determination module 708 can determine the road-crossing 210 to be the grade-separation 224 when the process determines that the road-crossing 210 is not the intersection 222.

It has been discovered that the junction-type 220 and the determination module 708 provide reliability, maintainability, and up-to-date navigation information and the map 204. The junction-type 220 and the determination module 708 can determine roads, intersections, and grade-separations in new developments not yet existing on the map. The junction-type 220 and the determination module 708 can also correct errors in the map 204 or update for road constructions to provide the navigation system 100 with the most reliable, maintainable, accurate, and current information.

It has further been discovered that the maneuver type 216, the traveled-path 214, the maneuver-detail 218, the past speed-location profile 402, and the determination module 708 provide reliability, maintainability, and accuracy for the navigation system 100 and the map 204. The determination module 708 can provide the accuracy and reliability by using various different types of data, including the maneuver type 216, the traveled-path 214, the maneuver-detail 218, and the past speed-location profile 402 to continuously check and update the junction-type 220 for all instances of the road-crossing 210.

It has yet further been discovered that the maneuver type 216, the traveled-path 214, the maneuver-detail 218, the past speed-location profile 402, and the determination module 708 provide for decrease in routing errors. The maneuver type 216, the traveled-path 214, the maneuver-detail 218, the past speed-location profile 402, and the determination module 708 can correctly identify the junction-type 220 of the road-crossing 210, which can allow the navigation system 100 to route accordingly.

The physical transformation of the map 204 such as constructions or blockades at the road-crossing 210, results in movement in the physical world, such as the users taking alternate routes or stopping, based on the operation of the navigation system 100. The movement of people and entities in the real world can be fed back to the navigation system 100 to determine the junction-type 220 and further operate the navigation system 100 to guide the user.

Figure 8:
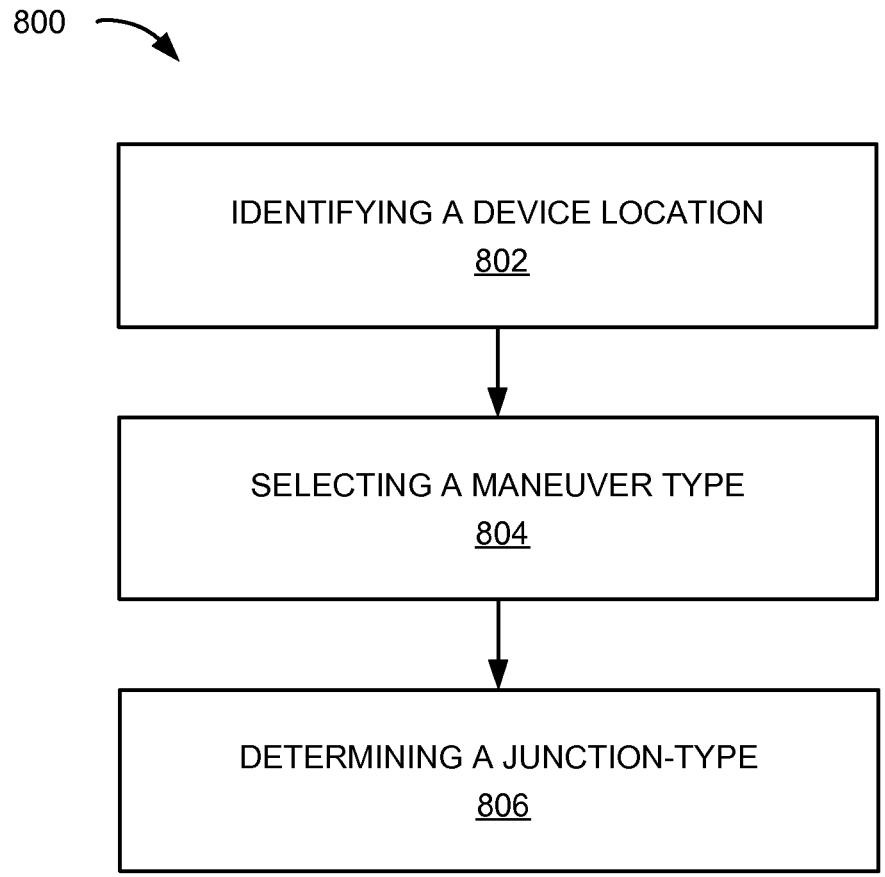
FIG. 8 is a flow chart of a method of operation of the navigation system in a further embodiment of the present invention.

Referring now to FIG. 8, therein is shown a flow chart of a method 800 of operation of the navigation system 100 in a further embodiment of the present invention. The method 800 includes: identifying a device location in a block 802; selecting a maneuver type with the device location in a block 804; and determining a junction-type with the maneuver type for displaying on a device in a block 806.

Yet other important aspects of the embodiments include that it valuably supports and services the historical trend of reducing costs, simplifying systems, and increasing performance.

These and other valuable aspects of the embodiments consequently further the state of the technology to at least the next level.

Thus, it has been discovered that the navigation system of the present invention furnishes important and heretofore unknown and unavailable solutions, capabilities, and functional aspects for improving reliability in systems. The resulting processes and configurations are straightforward, cost-effective, uncomplicated, highly versatile, and effective, can be implemented by adapting known technologies, and are thus readily suited for efficiently and economically operating navigation systems.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system including a device comprising:
   identifying a traveled-path using a set of device locations for locating the device;
   identifying a device-acceleration along the traveled-path along a horizontal plane for identifying the device-acceleration of the device along the horizontal plane relative to a ground surface of the traveled-path;
   determining a maneuver type using the traveled-path and the device-acceleration along the horizontal plane for representing the maneuver type as a turn at a road-crossing; and
   determining, using a control unit of the navigation system, a junction-type based on the maneuver type from the traveled-path and the device-acceleration for displaying on the device.

2. The method as claimed in claim 1 wherein determining the junction-type includes determining an intersection.

3. The method as claimed in claim 1 wherein determining the junction-type includes determining a grade-separation.

4. The method as claimed in claim 1 wherein determining the maneuver type includes identifying a maneuver-detail.

5. The method as claimed in claim 1 wherein determining the maneuver type includes identifying a current movement-rate.

6. A method of operation of a navigation system including a device comprising:
   identifying a traveled-path using a set of device locations for locating the device;
   identifying a device-acceleration along the traveled-path along a horizontal plane for identifying the device-acceleration of the device along the horizontal plane relative to a ground surface of the traveled-path;
   determining a maneuver type using the traveled-path and the device-acceleration along the horizontal plane for representing the maneuver type as a turn at a road-crossing; and
   determining, using a control unit of the navigation system, a junction-type as an intersection or a grade-separation based on the maneuver type meeting a crossing threshold, a floating threshold, or a combination thereof for displaying on the device, wherein determining the junction-type is based on the maneuver type from the traveled-path and the device-acceleration.

7. The method as claimed in claim 6 further comprising:
   selecting a map including the road-crossing; and wherein:
   determining the junction-type includes determining the junction-type of the road-crossing on the map.

8. The method as claimed in claim 6 further comprising:
   setting a junction region surrounding the road-crossing;
   identifying a past speed-location profile within the junction region; and
   wherein:
   determining the junction-type includes determining the junction type of the road crossing using the past speed-location profile.

9. The method as claimed in claim 6 further comprising:
   setting a junction region surrounding the road-crossing;
   identifying a current movement-rate; and wherein:
   determining the maneuver type includes identifying the current movement-rate within the junction region.

10. The method as claimed in claim 6 further comprising:
    identifying the road-crossing between a first road segment and a second road segment; and wherein:
    determining the junction-type includes determining the intersection when the traveled-path is along the first road segment and the second road segment.

11. A navigation system including a device comprising:
    a control unit of the navigation system configured to:
    identify a traveled-path using a set of device locations for locating the device;
    identify a device-acceleration along the traveled-path along a horizontal plane for identifying the device-acceleration of the device along the horizontal plane relative to a ground surface of the traveled-path;
    determine a maneuver type using the traveled-path and the device-acceleration along the horizontal plane for representing the maneuver type as a turn at a road-crossing;
    determine a junction-type based on the maneuver type from the traveled-path and the device-acceleration for displaying on the device; and
    a storage interface, coupled to the control unit, for storing the junction-type.

12. The system as claimed in claim 11 wherein the control unit is configured to determine an intersection in determining the junction-type.

13. The system as claimed in claim 11 wherein the control unit is configured to determine a grade-separation in determining the junction-type.

14. The system as claimed in claim 11 wherein the control unit is configured to identify a maneuver-detail in determining the maneuver type.

15. The system as claimed in claim 11 wherein the control unit is configured to identify a current movement-rate in determining the maneuver type.

16. The system as claimed in claim 11 wherein the control unit is configured to determine the junction-type as an intersection or a grade-separation when the maneuver type meets a crossing threshold, a floating threshold, or a combination thereof.

17. The system as claimed in claim 16 wherein the control unit is configured to:
    select a map including the road-crossing; and
    determine the junction-type of the road-crossing on the map.

18. The system as claimed in claim 16 wherein the control unit is configured to:
    set a junction region surrounding the road-crossing;
    identify a past speed-location profile within the junction region; and
    determine the junction type of the road-crossing using the past speed-location profile.

19. The system as claimed in claim 16 wherein the control unit is configured to:
    set a junction region surrounding the road-crossing;
    identify a current movement-rate; and
    identify the current movement-rate within the junction region in determining the maneuver type.

20. The system as claimed in claim 16 wherein the control unit is configured to:
    identify the road-crossing between a first road segment and a second road segment; and
    determine the intersection when the traveled path is along the first road segment and the second road segment.

* * * * *